US008054198B2

(12) United States Patent
Spinelli et al.

(10) Patent No.: US 8,054,198 B2
(45) Date of Patent: Nov. 8, 2011

(54) SPHERICAL SENSOR AND DATA COLLECTION VEHICLES

(75) Inventors: Charles B. Spinelli, Bainbridge Island, WA (US); Tamaira E. Ross, Seattle, WA (US); John L. McIver, Bothell, WA (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 12/324,579

(22) Filed: Nov. 26, 2008

(65) Prior Publication Data
US 2010/0127890 A1    May 27, 2010

(51) Int. Cl.
*G08B 23/00* (2006.01)
*B62D 57/00* (2006.01)
(52) U.S. Cl. ......... 340/870.02; 180/7.1; 901/48; 901/50
(58) Field of Classification Search ............. 340/870.02; 180/7.1; 901/48, 50
See application file for complete search history.

(56) References Cited

U.S. PATENT DOCUMENTS

| | | | | |
|---|---|---|---|---|
| 3,746,117 A | * | 7/1973 | Alred | 180/21 |
| 4,042,252 A | * | 8/1977 | Winter | 280/206 |
| 6,289,263 B1 | * | 9/2001 | Mukherjee | 700/245 |
| 7,434,638 B2 | * | 10/2008 | Tanielian | 180/7.1 |

OTHER PUBLICATIONS

"Programs—SSP Truss", L'Garde Aerospace, Gossamer Structures, Instrumentation. 2006. Jul. 17, 2008, http://www.lgarde.com/programs/truss.htm, 2 pages.

Crider, D.H. and Richard R. Vondrak. "Understanding Stratigraphy in Lunar Polar Cold Traps", Lunar and Planetary Science XXXVIII (2007), 2 pages.
Feldman, W.C., et al. "Fluxes of Fast and Epithermal Neutrons from Lunar Prospector:Evidence for Water Ice at the Lunar Poles", Science 281 (1998) 1496-1500.
Margot, J.L., et al., "Topography of the Lunar Poles from Radar Interferometry: A Survey of Cold Trap Locations", Science 284 (1999), 1658-1660.
Nuclear Science Division, Lawrence Berkeley National, "Radioisotope Power Generation", The ABC's to Nuclear Science, Nov. 20, 2007, http://lbl.gov.abc/wallchart/chapters/13/8.html, 2 pages.
Zuber, Maria T. and Ian Garrick-Bethell, "What do we need to know to land on the moon again?", Science 300 (2005), http://www.sciencemag.org/content/310/5750/983.summary,1 page.
Houston, Charles S., "Selected Military Operations in Mountain Environments: Some Medical Aspects", Borden Institute—Army, Jul. 31, 2008, pp. 619-643.
2001 Mars Odyssey, The Grand Canyon of Mars—Valles Marinineris, http://mars.jpl.nasa.gov/odyssey/gallery/canyons/vallesmarineris.htm, 2001, 2 pages.

* cited by examiner

*Primary Examiner* — Michael Rutland Wallis
(74) *Attorney, Agent, or Firm* — Haynes and Boone, LLP

(57) ABSTRACT

An inexpensive unmanned mobile sensor and data collection rolling rover ("rollver") for exploring remote, inaccessible locations, such as deep craters and canyons, includes a hollow enclosure having a flexible wall that is expandable into the shape of a sphere, an apparatus for selectably expanding the wall of the enclosure, a sensor and instrumentation payload disposed within the enclosure and coupled to an inner surface of the wall of the enclosure, and a power supply for powering the payload at its destination. The rollver is adapted to roll to a target destination at least partially in response to at least one of an initial impetus imparted to the vehicle and gravitational forces acting thereon, and due to its relatively low cost, can be simultaneously deployed and used in an area of interest in relatively large numbers.

20 Claims, 2 Drawing Sheets

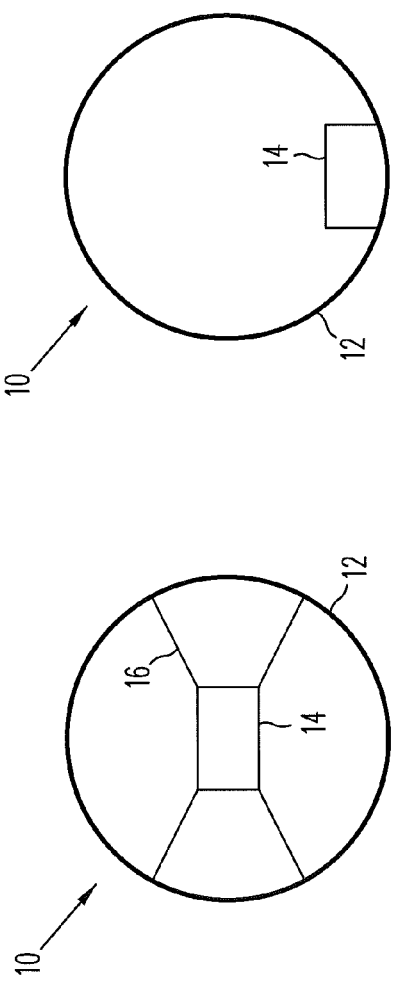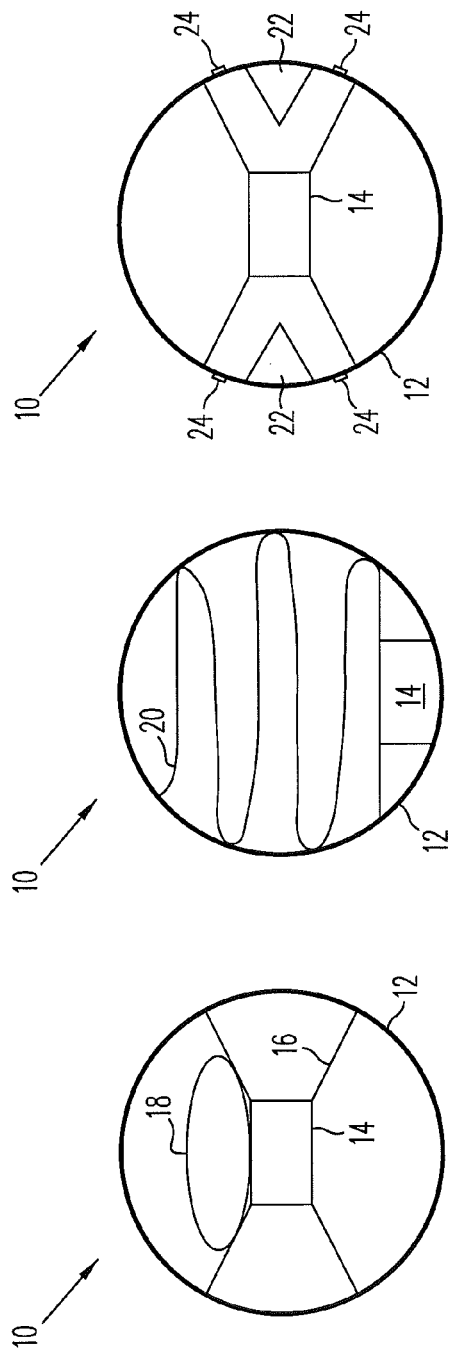

SPHERICAL SENSOR AND DATA COLLECTION VEHICLES

BACKGROUND

1. Technical Field

This disclosure relates to mobile sensor and data collection devices, in general, and in particular, to expandable spheres carrying instrument payloads for data collection that are rolled to the destinations at which data is to be collected.

2. Related Art

Access to remote locations in the solar system or to dangerous places here on Earth can be limited due to geographical, chemical, atmospheric or other constraints. Investigators are often interested in exploring or investigating areas that are located in remote holes, valleys or craters with steeply sloping sides. For example, shadowed deep craters (known as "cold traps") that exist on other planets, e.g., Mars and our own moon, are often places where water may exist, but are difficult to reach because of their rugged, deeply sloping sides. Such conditions make it difficult to acquire the desired data from such locations because it is difficult for either manned or unmanned vehicles to navigate the approaches to them.

Current solutions in space exploration include unmanned, mobile "rovers" and "landers" that are designed to be deployed to remote locations on other planets. Terrestrial exploration operations also rely on remotely operated roving or flying vehicles. However, in planetary exploration, it can be very difficult to get a lander or a rover to a location of interest, such as in the bottom of a crater or deep within a steep-walled canyon, due to the ruggedness and slope of the terrain. Current vehicles have extreme difficulty navigating these slopes without turning over, getting stuck, or sliding out of control. Also, once landed on a remote planet, landers cannot move to gather information that might lie out of range, and conventional rovers need large power sources for travelling to distant locations and must actively navigate around obstacles that could damage them.

Even in many terrestrial areas, access for remote reconnaissance vehicles can also be severely limited by steep slopes and long drives, and it is not cost-effective to send out many such vehicles at once to quickly scan a large area. Aerial vehicles can solve some of the accessibility problems, but cannot collect data directly on the surface of the Earth, and there are some places that aircraft cannot fly easily or where ground cover makes it difficult to see targets of interest. Landing such aircraft at the location may also be too risky. Both methods require powered movement, and can be large and hard to store.

Accordingly, a need exists for a delivery vehicle for deploying sensor and data collection devices to areas that are located in remote holes, valleys or craters with steeply sloping sides that is reliable, yet simple to make and use, that uses gravity as its primary motive force, and that is sufficiently inexpensive as to enable several sensor and data collection devices to be deployed in a given target area simultaneously and cost effectively.

BRIEF SUMMARY

In accordance with the present disclosure, a simple, relatively inexpensive, yet reliable vehicle is provided for deploying sensor and data collection "payloads" to areas that are located in inaccessible holes, valleys or craters with steeply sloping sides primarily by means of gravity.

In one example embodiment, a rolling sensor and data collection rover, or "rollver," comprises a hollow enclosure having a flexible wall that is expandable from a collapsed state into the shape of a rigid sphere, and an apparatus, which may be located within the enclosure, for expanding the wall of the enclosure into the spherical shape. A payload assembly, which may include, for example, a camera, a drill, a spectrometer, an accelerometer, a thermometer, a magnetometer, an altimeter, a barometer, a data communications antenna, a radio receiver and a radio transmitter, and the like, and a power supply for powering the payload assembly, is disposed within the enclosure and coupled to an inner surface of the enclosure wall.

In another embodiment, a method for collecting data at a remote location using the rollver includes expanding the collapsed enclosure of the rollver into the shape of a sphere using the expansion apparatus, and then curing the wall of the enclosure to make it rigid. The rollver is then launched toward the remote location in such a way that the rollver rolls over the ground at least a portion of the way to the location at least partially in response to at least one of an initial impetus imparted to the rollver and gravitational forces acting thereon. Data is then collected at the remote location using the payload of the rollver, and the data collected is then transmitted from the location to a remote receiver.

Due to their relatively low cost, the rollvers can be deployed and used in an area of interest simultaneously and in relatively large numbers.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 is a schematic cross-sectional view of an example embodiment of a gravity driven spherical instrument and data collection delivery vehicle, or "rollver," in accordance with the present disclosure, showing the vehicle in an inflated condition;

FIG. 2 is a schematic cross-sectional view of another example rollver embodiment, shown in an inflated condition;

FIG. 3 is a schematic cross-sectional view of another example rollver embodiment, shown in an inflated condition;

FIG. 4 is a schematic cross-sectional view of another example rollver embodiment, shown in an inflated condition;

FIG. 5 is a schematic cross-sectional view of another example rollver embodiment, shown in an inflated condition;

DETAILED DESCRIPTION

Figure 6:
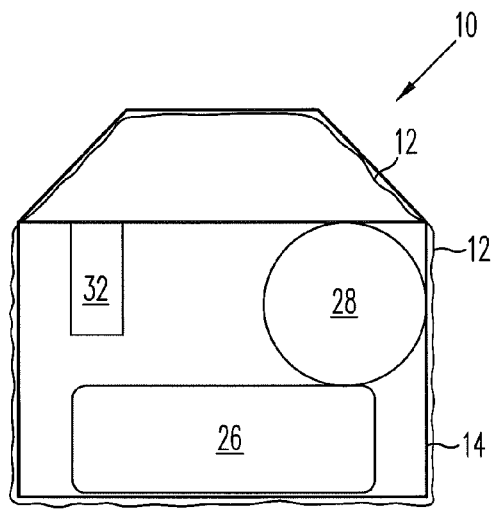
FIG. 6 is a schematic cross-sectional view of another example rollver embodiment, showing the vehicle in a deflated condition.

In accordance with the present disclosure, sensor and data collection payloads are carried inside flexible, inflatable structures having the shape of a sphere that are then rolled, e.g., down a sloping surface under the influence of gravity, to a stopping point. In some embodiments, a device may be included for controlling the directional of roll of the vehicle.

FIG. 1 is a schematic cross-sectional view of one example embodiment of a gravity driven spherical instrument and data collection delivery rolling rover, or "rollver" 10, in accordance with the present disclosure, showing the rollver 10 in an inflated condition. The example rollver 10 comprises a hollow enclosure 12 having a flexible wall that is collapsible, and which assumes the shape of a sphere when expanded, for example, when inflated with a gas, within which a sensor instrumentation and data collection payload assembly 14 is suspended by means of, for example, support bands or membranes 16 extending between an inner surface of the wall of the enclosure 12 and the payload assembly 14 for shock and impact cushioning. The enclosure 12 can be inflated by a variety of mechanisms, including an external pump inflator, an internal source, such as a source of compressed gas or a pyrotechnic inflator, or as discussed below in connection with FIG. 4, by a purely mechanical mechanism, such as a spring 20.

In one advantageous embodiment, the enclosure 12 may be made of a polymeric material, e.g., Mylar, polyethylene or polytetrafluoroethylene, or alternatively, of a polymer that cures, i.e., polymerizes, when exposed to ultraviolet (UV) light. The enclosure 12 may be fabricated, for example, by a layup or a blow molding process in two hemispherical portions that are subsequently joined together at an equatorial seam. Advantageously, the wall of the enclosure 12 may be internally reinforced with a fiber, e.g., carbon or glass fibers, for strength. This type of construction allows not only for exterior strength but also for the provision of holes or ports in the surface of the enclosure 12 without causing deflation. Data may be taken through such holes or ports, or alternatively, the wall of the enclosure 12 or a portion thereof can be made transparent to visible light or other bands of electromagnetic radiation. Also, it may be noted that, because the enclosure 12, when inflated, can have a diameter larger than that of the wheel of a conventional rover vehicle, the rollver 10 can surmount greater obstacles in its path than a conventional driving vehicle could while still retaining the capability, as discussed below, of being stowed in a relatively small package prior to its deployment.

In the example embodiment of FIG. 1, the sensor and data collection payload assembly 14 is disposed at about the center of the enclosure 12 when the latter is inflated, and no directional control apparatus is provided within the rollver 10. The "bubble" of the enclosure 12 is inflated around the payload assembly 14 immediately prior to the deployment of the rollver 10, which may be effected either from a spacecraft or from a land base source, and in one embodiment, then allowed to cure, e.g., in ambient sunlight, to become a relatively rigid sphere. Given an initial impulse at deployment, e.g., by means of a hand toss, or from a hand-held or vehicle-mounted launcher (not illustrated) powered by, e.g., compressed air, a spring or a pyrotechnic device, the rollver 10 then continues to roll under the influence of its initial momentum and gravity until it fetches up at its ultimate destination. As described below, the enclosure 12 and the payload assembly 14 support bands 16 may be stowed in a relatively compact, folded condition and stored against the outer surface of the payload assembly 14 until the time at which the rollver 10 is inflated for deployment, and then extended by the inflation procedure to the positions illustrated in FIG. 1 to support the payload assembly 14 securely within the protective inflated enclosure 12.

As illustrated in FIG. 2, in another possible embodiment, the payload assembly 14 may be disposed directly against the internal surface of the enclosure 12 on one side thereof. In this offcenter embodiment, when the enclosure 12 is inflated and hardened, the payload assembly 14 is still disposed safely on the inside of the enclosure. However, while this design eliminates the need for the support bands 16, because the mass of the payload assembly 14 is offset from the center of the enclosure 12, the offset arrangement will affect how the rollver 10 rolls over the ground after an initial impetus is applied thereto.

Figure 9:
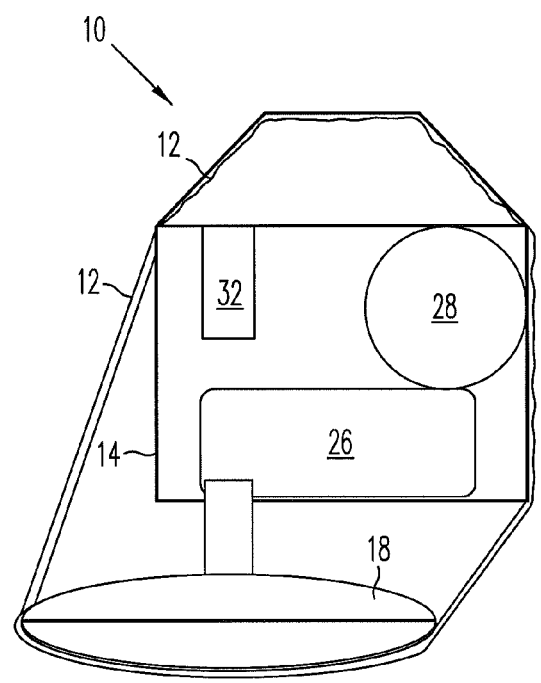

As illustrated in FIGS. 3 and 9, rolling control mechanisms 18 may be disposed inside the rollver 10 to effect a degree of control over its direction of roll. For example, as illustrated in FIG. 3, the rollver 10 may include a small moment-control gyroscope mechanism 18 attached to the payload assembly 14. Alternatively, a flywheel mechanism 18 may be used in place of a gyroscope mechanism. As discussed below, a flywheel mechanism 18 can not only provide a vehicle rolling stability control mechanism, but can also provide electrical power to the payload assembly 14. In such an embodiment, the spinning flywheel of the mechanism 18 is coupled with a small electrical generator. The flywheel is spun up at the initial deployment of the rollver 10, and the electrical energy produced by the generator is used to power the payload assembly 14 during the initial deployment of the rollver 10 to its destination and thereafter for as long as the flywheel remains spinning.

Also, it should be understood that the enclosure 12 of the rollver 10 need not necessarily be inflated by a gas. As illustrated in FIG. 4, in an alternative embodiment, the enclosure 12 can be arranged to pop open by means of resilient mechanism, such as a spring 20 comprising a band of resilient metal wire or other flexible material wound around the inside of the enclosure. In this embodiment, the rollver 10 is stowed in a compressed state, and when deployed, springs open like a pop-up sun tent or a collapsible laundry hamper. This arrangement eliminates the need for a pump or other inflation device for inflating the enclosure 12, and when it is popped open by the spring 20, the enclosure 12 may be allowed to cure to a relatively rigid state by exposure to sunlight.

Another embodiment of the rollver 10 is illustrated in FIG. 5. In this embodiment, the rollver 10 is not propelled entirely by gravity acting on a weighting system, but instead, at least partially by a cold gas propulsion system that effects movements of the rollver. In particular, in FIG. 5, two small tanks 22 of a compressed gas, such as carbon dioxide, are respectively provided with nozzles 24 and arranged to jet the compressed gas outside the surface of the enclosure 12 in selected directions to propel the rollver 10 along the ground.

In another embodiment, the rollvers 10 of the present disclosure are provided with an internal source of electrical power, which may be either rechargeable or for a one-time only use, in order to fulfill their respective missions. The power may come from a variety of sources, including but not limited to, batteries, a small radioisotope powered thermoelectric generator, a flywheel type of rolling control and generator mechanism 18 as discussed above (i.e., usable for both power and directional control), solar power, power that is "beamed" to the rollver 10 by, e.g., RF or laser radiation transmitted from a remote power transmitter, or in limited terrestrial circumstances, a small internal combustion engine and associated generator system.

FIGS. 6-9 illustrate various alternative embodiments of the rollver 10 of the present disclosure in a deflated state, i.e., with the bulk of the enclosure 12 collapsed atop the payload assembly 14, with the balance "shrink-wrapped" around the payload structure in, e.g., a UV opaque protective cover (not illustrated) applied in a vacuum bagging operation, and arranged to inflate around the structure of the payload assembly 14 when inflated.

The payload assembly 14 is an important component of the rollver 10, and while it may include any number of instrumentation and information collection packages 26, there are some components that will be fairly common to all versions of the rollver 10. These components may comprise, for example, a communications antenna 28, as illustrated in FIGS. 6-9, a power source 30, such as a battery, for the instruments of the payload assembly 14, as illustrated in FIG. 8 and discussed above, and a pump, a compressed gas source or a pyrotechnic device 32 used to inflate the spherical enclosure 12 prior to deployment, as illustrated in FIGS. 6-9. The antenna 28 may comprise, for example, an omnidirectional S-band antenna, and the enclosure 12 may comprise a material that is transparent to radio frequency radiations for transmission of data to remote data receivers. It is also possible to place a receiver in the payload assembly 14, e.g., in the instrumentation and information collection package 26, and the receiver can be arranged to receive a remote signal operable to, e.g., initiate inflation of the enclosure 12 or, as illustrated in FIGS. 3 and 9, to steer a gyroscopic or flywheel-type of rolling control mechanism 18 of the rollver 10 as it rolls toward its intended destination, i.e., to remotely control the direction of roll of the rollver 10.

In some applications, the instrumentation and information collection packages 26 of the rollvers 10 may include a transmitter that acts as a navigational beacon. With data received from one or more of these beacons, another vehicle, such as an aircraft or land vehicle, can track its own progress, or route between or around the beacons, e.g., in order to find a safe location to land. Once these beacons are in position (i.e., at the locations where the rollvers 10 come to rest), the beacon transmitters can be programmed to transmit continuously, intermittently for set periods of time, or to be remotely activated and deactivated on command.

Figure 7:
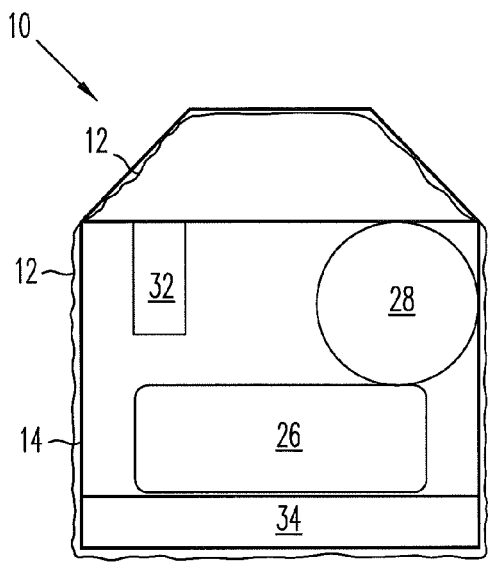
FIG. 7 is a schematic cross-sectional view of another example rollver embodiment, showing the vehicle in a deflated condition.
Figure 8:
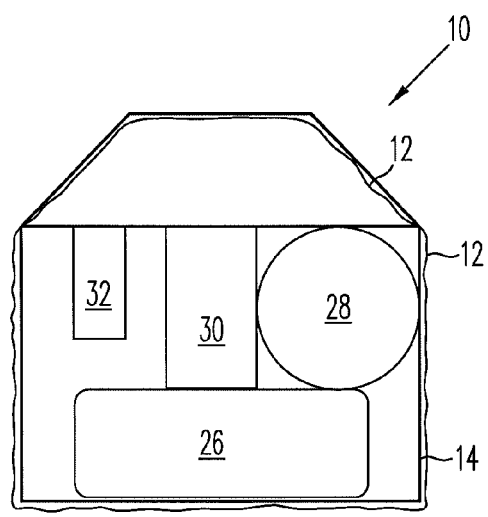
FIG. 8 is a schematic cross-sectional view of another example rollver embodiment, showing the vehicle in a deflated condition; and, FIG. 9 is a schematic cross-sectional view of another example rollver embodiment, showing the vehicle in a deflated condition.

As illustrated in FIG. 7, in one embodiment, the rollver 10 may derive electrical power from a solar panel 34 mounted on the payload assembly 14 and arranged to receive solar radiation through the wall of the enclosure 12. As discussed above, the inflation device 32 of the embodiments of FIGS. 6-9 may comprise a pump using internal energy of the rollver 10, a source of compressed gas, a pyrotechnic device, or even a pop-up spring 20, as in the embodiment of FIG. 4. As discussed above and illustrated in FIG. 9, the power source may comprise a flywheel-type of rolling control and electrical generator mechanism 18 attached to the payload assembly 14.

The rollver 10 of the present disclosure can be deployed in a variety of ways. Because the exterior surface of the enclosure 12 is relatively durable, it is possible to deploy the device in space from either a lander on the edge of a crater or valley, or on earth from a ridgeline or an aircraft. From an aircraft, the device can be dropped from the aircraft, inflated during its decent, and once it strikes the ground, then rolled by momentum and/or under the influence of gravity to its final destination. It can also be launched by hand, from a canon, mortar or hand-held launcher and thereby "shot" toward its destination.

The primary objective of the rollver 10 is to gather and transmit data to the user(s) who deployed it. The bulk of this mission is carried out by the instrumentation and information collection package 26 of the payload assembly 14. The purpose of the enclosure 12 is to act as a protective delivery device for getting the payload assembly to the location of interest. The components of the instrumentation and information collection package 26 may include, but are not limited to: Cameras, drills, spectrometers, accelerometers, thermometers, magnetometers, altimeters, barometers, communications antennae (necessary for data transmission), and radio receivers and transmitters.

If the enclosure 12 is constructed of a curable composite, it can incorporate a number of desirable features. For example, the enclosure 12 can be made transparent, allowing for photographs to be taken from inside it, and also allowing for solar panels 34 to be disposed in the center of the enclosure 12 along with the payload assembly 14 to provide electrical power. As discussed above, the enclosure 12 can also be made transparent to radio waves, allowing for trans-mission of data to and receipt of data from a mission control source. It is also possible to cover the outer or inner surface of the enclosure 12 with a conformal photovoltaic array for providing electrical power to the payload assembly 14. As those of skill in the art will appreciate, a solar power system may work very well in some deployment areas but not in others (e.g., if the rollver 10 were deployed in a deep crater or a mine shaft).

The UV curing of the enclosure 12 is possible in almost all environments of deployment. In space, UV light is plentiful, and on Earth, is readily available in sunlight. Also, because UV light reflects from the adjacent terrain, even parts of the surface of the enclosure 12 that are not directly exposed to sunlight will still have the opportunity to cure.

The rolling, inflatable data collecting rollvers 10 require much less energy to operate, cost substantially less to manufacture, and are much easier to store and then deploy in relatively large numbers to remote locations, than current roving or airborne reconnaissance vehicles. Thus, a single rollver 10, or several acting together, can be used as a path-tracing device or a navigation beacon for larger craft which follow after them to their deployment site.

The rollver 10 of the present disclosure can be deployed to gather information in places that current exploration vehicles are not designed to go. Due to its spherical shape, it can use the energy provided by initial momentum and/or gravity to get to its destination without the need for power for movement. It is also easily packable, because the exterior surface of the rollver 10 that rolls along the ground, i.e., the enclosure 12, is both inflatable and durable.

To gather information, current planetary exploration systems rely mostly on rovers or landers, which either sit in one spot or drive on wheels or treads to gather data. Typically, few are deployed at a time, because they are expensive to build and operate. However, because of their comparative simplicity and lower cost, a relatively large number of the rollvers 10 of the present disclosure can be deployed over a larger area, and can also travel relatively long distances down sloping terrains without using the driving power needed by conventional exploration rovers.

Conventional terrestrial exploration vehicles typically involve either driving or aerial vehicles, both of which require power and are not usually deployed in large numbers due to their relatively high cost. For example, for military applications, unmanned aerial vehicles can cost from a few thousand to several million dollars. Unmanned ground vehicles can also cost thousands, even tens of thousands of dollars. The rollvers 10 of this disclosure therefore provide an economical alternative to such conventional vehicles because they can be deployed in large numbers over the area of interest at a fraction of the cost of a single conventional exploration vehicle.

Additionally, as discussed above, the novel rollvers 10 can also include transmission devices that enable a network of them to act as navigation beacons to guide another system into position, or can provide "tracing" data, i.e., a map of the path the rollver 10 took to get to its final resting position. This enables an inexpensive but effective mapping of the terrain.

The rollvers 10 of the present disclosure can also reach areas of interest that other current vehicles are not designed to reach, or are incapable of reaching, to collect important data. Because the rollvers 10 are relatively smaller, require less power and are less expensive than conventional driving or flying vehicles, they can be deployed in large groups so that a large amount of data can be acquired at once, rather than "serially," as with a single conventional vehicle that slowly wends its way over the same area of interest.

The instant rollver 10 is also capable of military applications, for example, as detectors of enemy activity in dangerous areas, or as a single sensor in a network of remote reconnaissance equipment. Terrestrially, rollvers 10 can be employed for reconnaissance in remote or dangerous locations that could not be reached with an airborne or roving probe. Also, the International Atomic Energy Agency (IAEA) or other atomic energy related agencies could use the rollvers to investigate hazardous nuclear areas.

NASA or other space agencies around the world can also employ the rollvers 10 as planetary exploration tools. The current technologies for exploring remote or hazardous areas on Earth and in space are expensive and limited in many scenarios. For example, in space, there are many places of interest, such as the Shackleton Crater on the Moon or the Valles Marineris on Mars that cannot be explored with the technologies available today because the exploration vehicles cannot navigate or reach these locations. However, the rollver 10 makes possible exploratory missions to the moon, Mars, and many other places in the solar system that extend down into areas of the surface that were previously inaccessible. In particular, one advantageous application of the rollver 10 is the exploration of so-called "cold traps." Often, planetary areas that see no sun and thus remain at very low temperatures can harbor interesting kinds of ice, possibly including water ice.

By now, those of some skill in this art will appreciate that many modifications, substitutions and variations can be made in and to the materials, apparatus, configurations and missions of the inflatable, gravity driven, spherical rollver sensor data collection rollvers 10 of the present disclosure without departing from its spirit and scope. Accordingly, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. An unmanned mobile sensor and data collection vehicle ("rollver"), comprising:
    a hollow enclosure having a flexible wall that is expandable into the shape of a sphere;
    an apparatus for expanding the wall of the enclosure into the spherical shape;
    a payload disposed within the enclosure and coupled to an inner surface of the wall of the enclosure; and,
    a power supply for powering the payload,
    wherein the vehicle is adapted to roll to a target destination at least partially in response to at least one of an initial impetus imparted to the vehicle and gravitational forces acting thereon.
2. The rollver of claim 1, wherein the wall of the enclosure comprises a polymeric material that cures in response to irradiation with ultraviolet (UV) light.
3. The rollver of claim 2, wherein the polymeric material is reinforced by fibers embedded therein.
4. The rollver of claim 1, wherein the wall of the enclosure comprises two hemispherical portions joined together at a seam.
5. The rollver of claim 1, wherein the apparatus for expanding the wall of the enclosure comprises a resilient spring disposed within the enclosure.
6. The rollver of claim 1, wherein the wall of the enclosure is gas impermeable, and wherein the apparatus for expanding the wall of the enclosure comprises a source of a pressurized gas for inflating the enclosure with the gas.
7. The rollver of claim 6, wherein the source of the pressurized gas comprises a pump, a pressurized tank or a pyrotechnic gas generator.
8. The rollver of claim 1, wherein the payload is coupled to the inner surface of the enclosure wall by a plurality of flexible support bands such that the payload is thereby supported at about the center of the enclosure when the enclosure is fully expanded.
9. The rollver of claim 1, wherein the payload is directly coupled to the inner surface of the enclosure wall.
10. The rollver of claim 1, wherein the power supply comprises one of the group consisting of a battery, a thermoelectric generator, a flywheel generator system, a solar panel, high frequency radiation transmitted from a remote source and an internal combustion engine powered generator system.
11. The rollver of claim 1, wherein the payload comprises at least one of the group consisting of a camera, a drill, a spectrometer, an accelerometer, a thermometer, a magnetometer, an altimeter, a barometer, a data communications antenna, a radio receiver and a radio transmitter.
12. The rollver of claim 1, further comprising a mechanism for controlling the direction in which the vehicle rolls.
13. The rollver of claim 12, wherein the roll direction control mechanism comprises one of a gyroscope and a flywheel.
14. The rollver of claim 1, further comprising a source of a compressed gas and a nozzle operable in combination therewith to propel the vehicle over the ground.
15. A method for collecting data at a remote location, the method comprising:
    providing an unmanned mobile sensor and data collection vehicle ("rollver") adapted to roll to the remote location at least partially in response to at least one of an initial impetus imparted to the rollver and gravitational forces acting thereon, the rollver comprising:
        a hollow enclosure having a flexible wall that is expandable into the shape of a sphere;
        an apparatus for expanding the wall of the enclosure;
        a payload disposed within the enclosure and coupled to an inner surface of the wall of the enclosure; and,
        a power supply for powering the payload;
    expanding the enclosure of the rollver into the shape of a sphere;
    launching the rollver toward the remote location in such a way that the rollver rolls over the ground at least a portion of the way to the location;
    collecting data at the remote location with the payload of the rollver; and,
    transmitting the data collected at the remote location to a remote receiver.
16. The method of claim 15, wherein the remote location is disposed at about the bottom of a deep hole, valley or crater with steeply sloping sides.
17. The method of claim 15, wherein the expanding of the wall of the enclosure comprises inflating the enclosure with a gas.

18. The method of claim 15, further comprising curing the wall of the enclosure.

19. The method of claim 18, wherein the curing of the enclosure wall comprises irradiating the enclosure with ultraviolet (UV) radiation.

20. The method of claim 15, further comprising using the rollver as a locator beacon.

* * * * *